United States Patent
Tarnowski

(10) Patent No.: US 9,222,466 B2
(45) Date of Patent: Dec. 29, 2015

(54) WIND-POWER PRODUCTION WITH REDUCED POWER FLUCTUATIONS

(75) Inventor: Germán Claudio Tarnowski, Virum (DK)

(73) Assignee: Vestas Wind Systems A/S, Aarhus N. (DK)

( * ) Notice: Subject to any disclaimer, the term of this patent is extended or adjusted under 35 U.S.C. 154(b) by 128 days.

(21) Appl. No.: 13/816,713

(22) PCT Filed: Aug. 10, 2011

(86) PCT No.: PCT/DK2011/050307
§ 371 (c)(1), (2), (4) Date: Feb. 12, 2013

(87) PCT Pub. No.: WO2012/019613
PCT Pub. Date: Feb. 16, 2012

(65) Prior Publication Data
US 2013/0140820 A1 Jun. 6, 2013

Related U.S. Application Data

(60) Provisional application No. 61/373,414, filed on Aug. 13, 2010.

(30) Foreign Application Priority Data

Aug. 13, 2010 (DK) .............................. 2010 00712

(51) Int. Cl.
*F03D 9/00* (2006.01)
*F03D 7/02* (2006.01)
(Continued)

(52) U.S. Cl.
CPC .............. *F03D 9/005* (2013.01); *F03D 7/0284* (2013.01); *F03D 7/042* (2013.01); *F03D 9/003* (2013.01);
(Continued)

(58) Field of Classification Search
CPC ....... F03D 7/0284; F03D 9/003; F03D 9/005; F03D 7/042; Y02E 10/763; Y02E 10/723; H02J 3/24; H02J 3/386; H02J 3/48; F05B 2270/337; F05B 2240/96; F05B 2270/32; F05B 2270/404; F05B 2260/821; F05B 2260/70; F05B 2270/1033
USPC .......................................................... 290/44
See application file for complete search history.

(56) References Cited

U.S. PATENT DOCUMENTS 6,670,721 B2 * 12/2003 Lof et al. ......................... 290/44
6,965,174 B2 * 11/2005 Wobben .......................... 290/44
(Continued)

FOREIGN PATENT DOCUMENTS

EP 1914419 A1 4/2008
WO 2009112605 A1 9/2009
(Continued)

OTHER PUBLICATIONS

International Search Report dated Feb. 12, 2011 for International Application No. PCT/DK2011/050307, 3 pages.
(Continued)

*Primary Examiner* — Michael Zarroli
(74) *Attorney, Agent, or Firm* — Patterson & Sheridan, LLP

(57) ABSTRACT

A method of operating at partial load a wind turbine (1) supplying electrical power to an electrical grid (20) includes monitoring stability of the grid; and upon detection of a reduced grid stability, changing operation of the wind turbine by limiting wind-caused fluctuations of the active-power supply to the electrical grid, or by reducing an already existing limit to fluctuations of the active-power supply.

21 Claims, 4 Drawing Sheets

(51) Int. Cl.
*F03D 7/04* (2006.01)
*H02J 3/24* (2006.01)
*H02J 3/38* (2006.01)
*H02J 3/48* (2006.01)

(52) U.S. Cl.
CPC . *H02J 3/24* (2013.01); *H02J 3/386* (2013.01); *F05B 2240/96* (2013.01); *F05B 2260/70* (2013.01); *F05B 2270/1033* (2013.01); *F05B 2270/337* (2013.01); *H02J 3/48* (2013.01); *Y02E 10/723* (2013.01); *Y02E 10/763* (2013.01)

(56) References Cited

U.S. PATENT DOCUMENTS

| | | | |
|---|---|---|---|
| 7,081,689 B2 * | 7/2006 | Tilscher et al. | 290/44 |
| 7,308,361 B2 * | 12/2007 | Enis et al. | 702/2 |
| 7,372,173 B2 | 5/2008 | Lutze et al. | |
| 7,462,946 B2 * | 12/2008 | Wobben | 290/44 |
| 7,462,947 B2 * | 12/2008 | Wobben | 290/44 |
| 7,622,816 B2 * | 11/2009 | Stahlkopf | 290/44 |
| 7,652,387 B2 * | 1/2010 | Corcelles Pereira et al. | 290/44 |
| 7,804,184 B2 * | 9/2010 | Yuan et al. | 290/44 |
| 7,830,127 B2 * | 11/2010 | Corcelles Pereira et al. | 322/24 |
| 7,898,100 B2 * | 3/2011 | Andersen et al. | 290/44 |
| 8,174,137 B2 * | 5/2012 | Skaare | 290/44 |
| 8,355,824 B2 * | 1/2013 | Yasugi | 700/287 |
| 8,373,312 B2 * | 2/2013 | O'Brien et al. | 307/140 |
| 8,378,643 B2 * | 2/2013 | Arinaga et al. | 322/29 |
| 8,674,535 B2 * | 3/2014 | Arlitt et al. | 290/43 |
| 2008/0150282 A1 * | 6/2008 | Rebsdorf et al. | 290/44 |
| 2010/0138063 A1 * | 6/2010 | Cardinal et al. | 700/291 |
| 2010/0237834 A1 * | 9/2010 | Alonso Sadaba et al. | 323/205 |
| 2011/0004356 A1 * | 1/2011 | Garcia | 700/287 |
| 2011/0012352 A1 * | 1/2011 | Nelson et al. | 290/44 |
| 2011/0057445 A1 | 3/2011 | Sanchez et al. | |
| 2011/0089693 A1 * | 4/2011 | Nasiri | 290/44 |
| 2012/0161444 A1 * | 6/2012 | Tarnowski | 290/44 |

FOREIGN PATENT DOCUMENTS

| | | |
|---|---|---|
| WO | 2010000663 A1 | 1/2010 |
| WO | 2010085987 A2 | 8/2010 |
| WO | 2010108979 A2 | 9/2010 |

OTHER PUBLICATIONS

DK Search Report dated Mar. 16, 2011 for Application No. PA2010 00712, 1 page.

Hau, Erich, "Windturbines: Fundamentals, Technologies, Application and Economics", 2000, pp. 389-391, Springer-Verlag Berlin Heidelberg, Germany.

* cited by examiner

WIND-POWER PRODUCTION WITH REDUCED POWER FLUCTUATIONS

FIELD OF THE INVENTION

The present invention relates to a method for operating a wind park or a wind turbine with reduced power fluctuations, and to a control system and a wind park or wind turbine arranged to carry out this method.

BACKGROUND OF THE INVENTION

In an electrical utility grid consumers can usually consume electric power in an uncontrolled manner. Since hardly any energy is stored in the grid, there can be no imbalance between the power produced and the power consumed. Therefore, the momentary production of power shall match the momentary power consumption. Overproduction leads to an increase of the grid frequency beyond the nominal value (e.g. 50 or 60 Hz), since the conventional synchronous generators accelerate, while overconsumption will lead to a decrease of the grid frequency beyond the nominal value (e.g. 50 or 60 Hz), since the conventional synchronous generators will then decelerate.

In order to stabilize the frequency of the electrical grid, conventionally about 10% of the producers contribute to what is called "primary power control". These producers, also referred to as "primary controllers", increase power output when the frequency falls below the nominal value and decrease power output when it rises above the nominal value.

Conventionally, wind turbines do not contribute to primary control, firstly because wind turbines cannot normally increase their output power by command (as they normally operate at nominal load or, when operating at partial load, at an optimal working point), and secondly because the available wind power shall normally be entirely exploited. Exceptions have been proposed in which the output power of a wind turbine is increased upon decrease of the grid frequency below a certain frequency limit, and vice versa.

Generally, wind power adds an additional moment of grid instability because, with a significant fraction of wind power in a grid, not only the consumption is uncontrolled, but also the production by wind turbines. Even though wind forecasts enable the wind power production to be predicted with considerable accuracy on a long-term basis (at the level of hours), the wind speed normally fluctuates in an unpredictable manner on a short-term basis (at the level of minutes down to a few seconds). A wind turbine operating at partial load (i.e. when the wind speed is below the nominal wind speed of the wind turbine considered) will normally transform these wind-speed fluctuations into corresponding fluctuations of the amount of real power produced and supplied to the electrical grid. Only at wind speeds above nominal, when a wind turbine operates at nominal load, wind turbines normally control their output power to be constant at the nominal output power.

The consequence of fluctuating-power production by wind turbines on the grid stability depends on characteristics of the grid. In a large, stable grid a power fluctuation by a wind turbine or wind park will not produce any significant response in the form of a frequency fluctuation. Thus, such grids can cope with higher power variations. However, in a small isolated grid, or in weak grids, such a power fluctuation may produce a significant frequency fluctuation, so that high short-term power variations may cause stability and regulation problems in the grid.

SUMMARY OF THE INVENTION

The invention provides a method of operating at partial load a wind turbine supplying power to an electrical grid which is equipped with regulation capacity against grid-frequency fluctuations. The method comprises monitoring stability of the electrical grid and, upon detection of reduced grid stability, changing operation of the wind turbine by limiting wind-caused fluctuations of the power supply to the electrical grid, or by reducing an already existing limit to fluctuations of the power supply.

According to a another aspect a control system is provided for controlling at least one wind turbine supplying power to an electrical grid. The control system is arranged to carry out a method comprising monitoring stability of the electrical grid and, upon detection of reduced grid stability, changing operation of the wind turbine by limiting wind-caused fluctuations of the power supply to the electrical grid, or by reducing an already existing limit to fluctuations of the power supply.

According to a further aspect a wind park or wind turbine is provided comprising a control for controlling at least one wind turbine supplying power to an electrical grid. The control system is arranged to carry out a method comprising monitoring stability of the electrical grid and, upon detection of reduced grid stability, changing operation of the wind turbine by limiting wind-caused fluctuations of the power supply to the electrical grid, or by reducing an already existing limit to fluctuations of the power supply.

Other features are inherent in the methods and products disclosed or will become apparent to those skilled in the art from the following description and the accompanying drawings.

BRIEF DESCRIPTION OF THE DRAWINGS

Embodiments of the present invention are explained by way of example with respect to the accompanying drawings, in which.

DETAILED DESCRIPTION OF EMBODIMENTS

Figure 1:
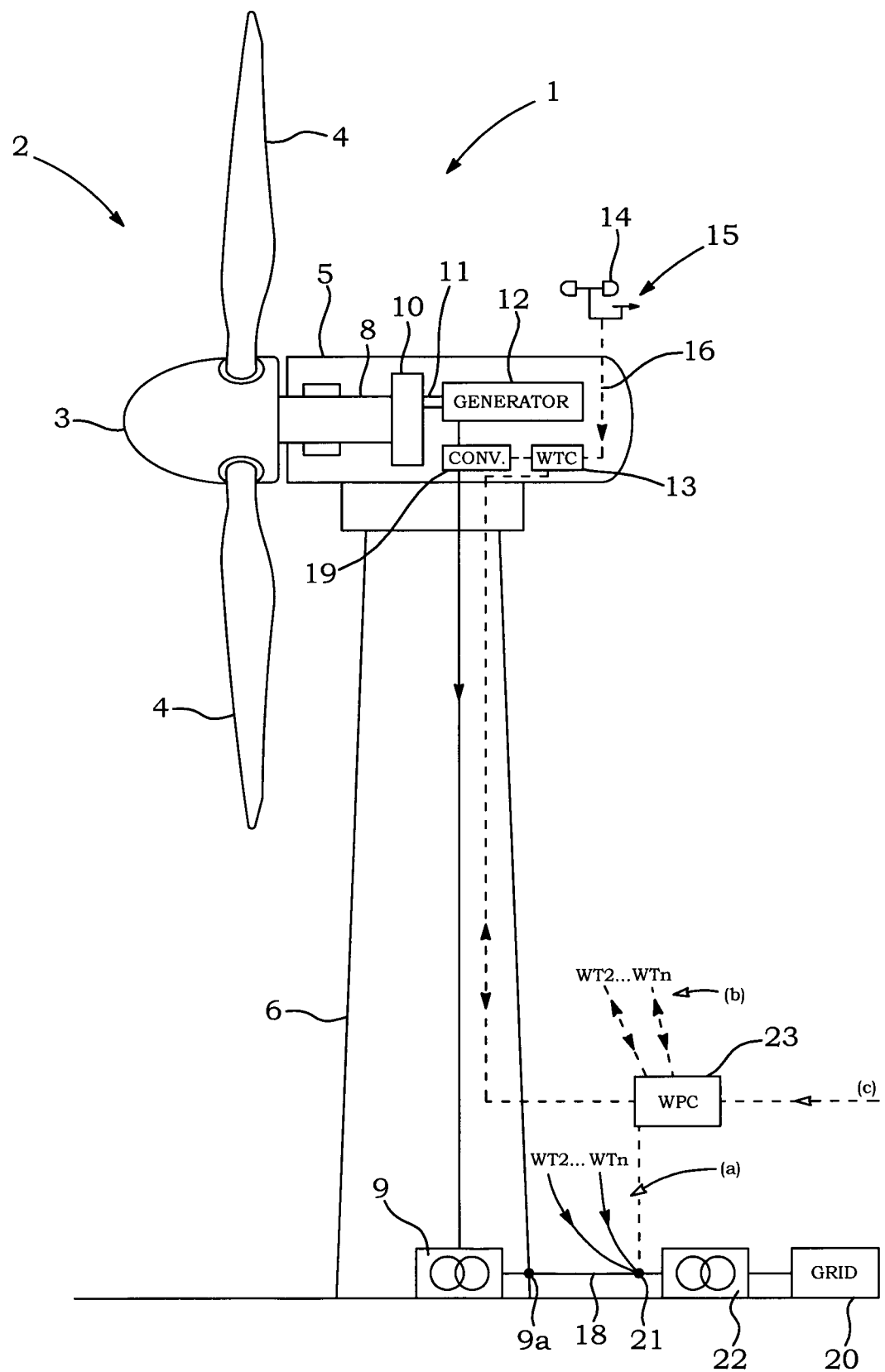
FIG. 1 schematically shows an embodiment of an exemplary wind turbine.

Before turning to the detailed description of embodiments on the basis of the drawings, a few more general items of embodiments will be discussed.

The embodiments pertain to a method of a operating a wind turbine (e.g. a variable-speed wind turbine) which supplies power to an electric grid which is equipped with regulation capacity against grid-frequency fluctuations. "Electric grid" or "grid" is a utility grid outside the boundary and point of common coupling of a wind park; when reference is made to the grid within a wind park an expression with explicit indication to the wind park is made, e.g., "wind-park grid". Regulation capacity against grid-frequency fluctuations is, e.g., provided by a certain fraction (typically about 10%) of primary controllers, which are typically conventional producers, which may use steam- or gas-driven turbines and fossil energy sources, or hydropower). The primary controllers increase power output when the frequency falls below the nominal value (e.g. 50 or 60 Hz) and decrease power output when it rises above the nominal value.

As the present text deals with active power rather than reactive power, active power is briefly referred to as "power", or "output power". Where reactive power is addressed, it is explicitly referred to as "reactive power"

There is an upper limit to the output power which can be produced by the wind turbine according to the embodiments, e.g. due to structural limits and a current limit in the wind turbine's electric converter. This amount of power is referred to as "nominal power". The wind speed sufficient for the wind turbine to produce the nominal power is referred to as "nominal wind speed". When the wind turbine according to the embodiments operates at wind speeds above the nominal wind speed, only that fraction of the available wind power is transformed to electric output power which corresponds to the nominal power. This reduction of power production is, e.g., achieved by gradually changing the rotor-pitch angle towards the so-called flag position. In other words, the wind turbine intentionally is not operated at optimum efficiency. In some embodiments the wind turbine is also operated at a sub-optimal tip-speed ratio so as to reduce structural loads.

By contrast, during operation at partial load, i.e. at wind speed below the nominal wind speed, the wind turbine according to the embodiments is operated at optimum efficiency. For example, it is operated with the aerodynamically optimal blade pitch angle and tip-speed ratio. Generally, the wind speed fluctuates in an unpredictable manner on a short-term basis (at the level of minutes down to a few seconds). When operating at partial load and with optimum efficiency the wind turbine according to the embodiments transforms these wind-speed fluctuations in a nearly one-to-one manner into corresponding wind-caused fluctuations of the amount of real power produced and supplied to the electrical grid. Fluctuations in the wind direction may also contribute to the wind-caused fluctuations of the amount of real power produced result in and supplied to the electrical grid because a wind-turbine's yaw adjustment mechanism is generally not able to immediately align the wind turbine's rotor axis to the wind direction. A misaligned rotor has a reduced efficiency so that fluctuations in the wind direction are a further source of wind-caused fluctuations of the amount of real power produced and supplied to the electrical grid.

As mentioned at the outset, the consequence of fluctuating-power production by wind turbines on the grid stability depends on characteristics of the grid. In a large, stable grid a power fluctuation by a wind turbine or wind park will not produce any significant response in the form of a frequency fluctuation. However, in a small isolated grid, or in weak grids, such a power fluctuation may produce a significant frequency fluctuation. A certain ability of the grid to compensate imbalances of power production and compensation and regulate resulting frequency variations, i.e. a certain degree of stiffness or weakness of the grid, is referred to as "grid-stability".

The inventor has recognized that the grid-stability may vary over time, for example due to grid-related failures, such as islanding of that part of the grid in which the wind turbine is located, due to primary-producer failures, etc. The inventor has also recognized that a deterioration of the grid stability can be detected by monitoring e.g. frequency fluctuations on the grid. Moreover the inventor has recognized that it is desirable in the case of a deterioration of the grid-stability conditions to limit the output-power fluctuations produced by the wind turbine and supplied to the grid or—if the wind turbine has already operated with limited output-power fluctuations before the deterioration occurred—to reduce the already existing fluctuation limit. "Reducing" the fluctuation limit means making the limit stricter. By this measure, although the wind turbine according to the embodiments does not operate as a primary controller, it contributes to grid stability by reducing source-induced fluctuations. However, limiting the output-power fluctuations the accumulated power output will generally be reduced and thereby the effective efficiency of the wind turbine lowered. However, by restricting this measure to situations in which the grid-stability is (temporarily) deteriorated, the loss of electric energy produced will be limited.

In the embodiments limiting the active-power fluctuations is, e.g., achieved by means of blade-pitch adjustment. In some embodiments active-power fluctuations are also limited electrically, by corresponding control of the wind turbine's electric-power converter. However, the latter results in imbalance between the amount of wind power converted into mechanical power of the wind turbine's rotor and the electric output power which, e.g., results in acceleration of the rotor. Therefore, in some embodiments electrically limiting power is only performed in combination with blade-pitch adjustment to cope with wind-speed transients For example, when the wind speed rises faster that the pitch can be adjusted to compensate for the wind-speed rise, the output power is first limited electrically and, once the blades have been pitched to their new pitch angle, is then limited by the pitch adjustment.

The present description focuses on limiting, or further limiting, the output-power fluctuations. However, the method also goes in the other direction, that is relaxing or cancelling the limit, in an analogous manner. That is to say, upon detection of increased grid stability, the operation of the wind turbine is changed by cancelling or relaxing a previously set fluctuation limit.

The monitoring and limit-adjustment function is a self-diagnosis and self-adjustment function performed by a control system at the level of individual wind turbines, or at the level of a wind-park, or at a higher level in the utility grid. The control system can also be distributed, e.g. include controllers at the wind-park and the wind-turbine level.

In some embodiments the frequency range covered by grid-frequency fluctuations is permanently determined, and a variation of the grid frequency outside an allowed-frequency range $F_{max}/F_{min}$ (between an allowed maximum frequency $F_{max}$ an allowed minimum frequency $F_{min}$) range is considered to be a detection of a reduced grid stability condition. Alternatively or in addition, the variance of the grid frequency is permanently determined, and a rise beyond a variance threshold is considered to be a detection of a reduced grid stability condition. The allowed fluctuation of the wind turbine's or wind park's power output is then reduced.

In some embodiments monitoring whether the grid-frequency fluctuations are within the allowed-frequency range, or whether their variance is below the variance threshold is performed in an absolute manner, i.e. without taking into account any correlation of the grid frequency and the output power produced by the wind turbine or wind park.

However, correlation-less monitoring grid-frequency fluctuations is somewhat unspecific in the sense that it is not ensured that the fluctuation of the wind-turbine or wind park considered actually contributes to the grid-frequency fluctuations observed. Therefore, in these embodiments the reduction of the fluctuation limit might be in vain, and would only produce costs (by the reduction of the accumulated power output caused by it). Therefore, in other embodiments the monitoring of grid stability comprises determining a correlation between power supplied to the electrical grid and grid frequency. Correlation means that if the power output increases the grid frequency also increases. The grid frequency is, e.g. measured at the wind turbine's terminals or at a wind park's point of coupling to the grid. If, however, no increase of the grid frequency is observed upon increase of the output power there is no correlation. Actually, "correlation" can be a continuous parameter measuring the degree of coincidence between the output power increase and the grid frequency rise. In some of the embodiments, the bigger is the correlation thus determined, the smaller is the grid stability detected. To be considered as an indicator for reduced grid stability, a rise of the correlation has to be significant in some embodiments, e.g. the rise has to exceed a maximum-acceptable correlation threshold. The allowed fluctuation of the wind turbine's output power is then reduced. Linking the reduction of the fluctuation limit to the observed correlation between output-power fluctuations and grid-frequency fluctuations ensures that the reduction of the output-power fluctuation limit actually contributes to reduction of the grid-frequency fluctuations.

In some embodiments, the correlation information is used to determine whether the variation of the grid frequency extends beyond the allowed-frequency range $F_{max}/F_{min}$, or whether the frequency variance exceeds the variance limit, by taking only those peaks (or dips) in the grid frequency into account which can be attributed to a corresponding peak (or dip) of the output power of the wind turbine or wind park considered. This is taking into account correlation on a peak-by-peak basis.

In other embodiments the correlation information is used for the same purpose more globally, (not peak-by-peak) by multiplying the uncorrelated fluctuation amplitude by the magnitude of the correlation, which may be a number between 0 and 1 (or by multiplying the uncorrelated frequency variance by the square of the fluctuation). "Diluting" the observed uncorrelated fluctuation amplitude or variance in this manner takes into account that only a fraction of the observed uncorrelated fluctuation amplitude or variance is due the output-power fluctuations of the wind turbine or wind park considered.

A prerequisite of such a correlation measurement is that there is a variation of the wind turbine's output power. In some embodiments, also referred to as "passive-variation embodiments", use is made of the output power variations caused by the natural wind-speed variations. These passive-power variations are tracked and correlated with the measured grid frequency.

In other embodiments, also referred to as "active-variation embodiments", one or more test variations of the power supplied to the grid are actively performed. The limit on the output power is not effective for the actively-performed variation; i.e. the actively-performed variation can be larger than the limit on the output power. The grid-frequency response is measured. The correlation between the test power and the grid frequency is determined, as with the passive-variation embodiments. Accordingly, the bigger is the grid-frequency response the smaller is the grid stability detected. The active variation is adapted to situations in which output-power variations caused by the natural wind-speed variations are insufficient (in frequency and/or amplitude) to determine the correlation. For example, in a state of operation in which a strict output-power limit has been set the limit will prevent any sufficient natural power fluctuation from appearing. Active variation is then performed by relaxing or canceling the fluctuation limit and waiting for a natural fluctuation leading to a high output-power peak. In some embodiments both the passive and active variation function is provided. For example, in the normal-operation mode (in which no, or a wide, variation limit has been set) passive variation is performed, while in the reduced-fluctuation mode (e.g. in which a strict variation limit has been set) active variation is performed.

In some of the embodiments, the correlation is determined according to a correlation function $$R_{xy} = \frac{1}{T_F} \int_{-T_F/2}^{T_F/2} x(t) \cdot y(t)\, dt,$$

(i.e. an auto-correlation function), where x(t) is the output power supplied as a function of time t, y(t) is the grid frequency as a function of time t, $T_F$ is a time period for which the correlation is determined. In a digital (discretized) implementation, the integral may be replaced by a sum over discrete bins of time. In active-variation embodiments the power variation may be chosen to be so short in time that there is only one summation term, i.e. no summation is required.

In certain cases the reaction of the grid frequency to an output-power variation is delayed. Accordingly, in some of the embodiments the correlation is determined according to a cross-correlation function which evaluates the functions to be correlated at different times:

$$R_{xy}(\tau) = \frac{1}{T_F} \int_{-T_F/2}^{T_F/2} x(t) \cdot y(t+\tau)\, dt$$

where $\tau$ is the time shift between x(t) and y(t). In some embodiments the delay in response is assumed to be fixed and is known in advance, the variable $\tau$ can be set to the delay. In other embodiments $\tau$ is a variable, the integral (or sum) is then evaluated for a plurality of different values of $\tau$, maximum of $R_{xy}(\tau)$ is finally determined and considered to be the correlation between the output power and the grid frequency.

In some embodiments the limit on power fluctuations is chosen such that the grid-frequency fluctuations caused by the supply of power are maintained inside the range $F_{max}/F_{min}$, or the variance of grid-frequency fluctuations caused by the supply of power is maintained below the variance limit.

In some of these embodiments the entire grid-frequency fluctuation (including the contribution not caused by the wind turbine or wind park considered) is to be maintained inside the range $F_{max}/F_{min}$, or below the variance threshold, while in other embodiments only that fraction of the grid-frequency fluctuations which is caused by the power supply of the wind turbine or wind park considered is maintained inside the range $F_{max}/F_{min}$, or below the variance threshold.

In some of the embodiments in which the (entire or fractional) grid-frequency fluctuation is to be maintained inside the range $F_{max}/F_{min}$, or below the variance threshold, the fluctuation limit to the output power is continuously adjusted to that extent of limit just needed to keep the grid frequency inside the range $F_{max}/F_{min}$, or the variance below the variance threshold. That means that the power production by the wind turbine or wind park is maximized by letting the output power fluctuate, but the fluctuation is limited, or modulated, if the grid frequency goes beyond $F_{max}/F_{min}$. Thus, the objective the continuous adjustment is to avoid the grid frequency to go out of the $F_{max}/F_{min}$ range without losing more power production than necessary.

In some embodiments the operation of the wind turbine is automatically switched between two discrete operation modes, that is to say from a normal-operation mode (i.e. a mode with no power-fluctuation limit, or with a relatively relaxed power-fluctuation limit) to a reduced-fluctuation mode (in which the power fluctuation limit is activated). The automatic mode switch from the normal-operation mode to the reduced-fluctuation mode is triggered, in some of these embodiments, by detection of a reduction of the grid stability beyond a lower mode-switch threshold. Switching from the reduced-fluctuation mode back to the normal-operation mode can likewise be triggered by detection of an increase of the grid stability beyond an upper mode-switch threshold.

In some of the mode-switching embodiments the reduced-fluctuation mode is maintained a minimum time interval before the mode can switch back to the normal-operation mode. By this measure too frequent mode switching can be avoided. Moreover, there may be a contractual agreement with the grid provider according to which the wind-power producer is committed to supply output power with strongly limited output-power fluctuation during a predetermined time interval, say 15 min. The wind-power producer can be compensated for the production loss suffered due to this (exemplary) 15-min. period of smooth output power supply.

In some of the mode-switching embodiments the power-fluctuation limit is kept constant during the reduced-fluctuation mode. Constancy of the power-fluctuation limit refers to the width of the limit relative to a mean output power; it does not necessarily mean that the absolute values of the upper and lower power limits are kept constant. In some embodiments the limit is relative to a mean value of the power produced. For example, if the mean power produced increases with time, the absolute values of the upper and lower power-fluctuation limits will also increase.

In other mode-switching embodiments the fluctuation limit is also adjusted to avoid the grid frequency to go out of the $F_{max}/F_{min}$ range without losing more power production than necessary, as was described above. This adjustment my be stepwise (an setting adjusted at the beginning of mode switch and then kept constant for a certain period of time) or continuous. Thus, the output-power adjustment to keep the grid frequency inside the range $F_{max}/F_{min}$, or below the variance threshold, to that extent of limit just needed to keep the grid frequency inside the range $F_{max}/F_{min}$, or the variance below the variance threshold applies to both the continuous-adjustment embodiments and the mode-switching embodiments.

It has already been mentioned that limiting power fluctuation may result in a loss of accumulated power. A loss of accumulated power could be avoided if not only peaks of the output power ("positive fluctuations") were cut, but also dips of the output power ("negative fluctuations") were lifted, or filled up, in a symmetric manner. However, in some embodiments the wind turbine is at its optimal working point during normal-mode operation, which does not allow any increase of the output power. Therefore, limiting output fluctuations is rather performed in an asymmetric manner, by cutting the output power during positive fluctuations (cutting high-output peaks), without (or without significantly) lifting the relative output power during negative fluctuations. As explained above, cutting the output power during positive fluctuations is, e.g., achieved by a corresponding adjustment of the blade-pitch angle towards the flag position.

However, in other embodiments an ability to lift the relative output power provided. This can be achieved by a wind turbine normally operating off its optimal working point, and counteracting negative wind-power fluctuations by shifting the working point towards the optimal working point. Although this measure renders the limitation of the output fluctuation more symmetric it also reduces the accumulated power production, due to the wind turbine's operation off the optimal working point.

The strictness of the limit on output-power fluctuations, and/or the position of the threshold which has to be exceeded by the grid instability so that mode switching is performed, may also depend on other factors than the monitored grid stability.

For example, in some of the embodiments a wind forecast is used to vary the fluctuation limit, e.g. to make it stricter when the forecast predicts increased wind-power fluctuation. Moreover, in mode-switching embodiments the mode-switch threshold may be varied in response to the wind forecast. For example, the threshold may be varied upon a forecast of increased wind-power fluctuation such that switching from the normal-operation mode to the reduced-fluctuation mode is already triggered at a less pronounced reduction of the grid stability.

Similarly, in other embodiments an expectation of power consumption in the electrical grid is used to vary the fluctuation limit, or to vary the mode-switch threshold. For example, a power-consumption expectation giving rise to expectation of increased grid-frequency fluctuation may render the fluctuation limit stricter, or modify the mode-switch threshold such that switching from the normal-operation mode to the reduced-fluctuation mode is already triggered at a less pronounced reduction of the grid stability.

Some embodiments pertain to a control system arranged to control at least one wind turbine—which may include some, or all, of the wind turbines of a whole wind park—in the manner describe above. The control system may be an individual wind-turbine controller, a wind park controller or a controller at a higher level in the grid and connected to the wind-turbine controller to send limit-fluctuation commands. The control system can be distributed, e.g. include controllers at the wind-park and the wind-turbine level or utility-grid level.

The control system comprises a computer or a plurality of distributed computers, e.g. in the form of one or more microcontrollers, referred to as "the computer". The method carried out by the control system is preferably provided as a computer program stored in one or more memories associated with the computer. The program can be executed out by the computer. The expression " . . . being arranged to carry out the method . . . " in the control-system claim, which is defined by method steps, therefore means that the computer is programmed such that it causes the claimed method steps to be carried out when the computer program is executed. The control system, wind turbine, and wind park defined in this manner is at least distinguished by this special programming (i.e. storage of this special computer program) from control systems, wind turbines and wind parks with the same hardware which are, however, not arranged (e.g. not programmed) to carry out said method.

A variable speed wind turbine, which is used in at least one of the above described embodiments and which is capable for being connected to an electrical grid is equipped with the control system described above. It comprises a rotor with a hub and at least one blade mounted to the rotor as discussed above. The rotor is connected, for example via a main shaft, to a generator for translating the torque of the rotor into electrical power. In some embodiments, a gearbox is interconnected between the rotor and the generator in order to translate the rotational speed of the rotor into a higher speed for the generator.

Turning now to FIG. 1, an exemplary variable-speed wind turbine 1 is one of a plurality of wind turbines of a wind park 2. It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high-speed shaft 11. This structure is exemplary; other embodiments, for example, use a direct-drive generator.

The generator 12 (e.g. a synchronous or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbin's terminals 9a. The electric power from the wind turbine 1 and from the other wind turbines of the wind park 2 is fed into a wind-park grid 18 (symbolized by "a" in FIG. 1). The wind-park grid 18 is connected at a point of common coupling 21 and an optional further up-transformer 22 to a wind-park-external electrical utility grid 20. The grid 20 is equipped with regulation capacity against grid-frequency fluctuations, e.g. in the form of conventional producers which can increase and lower production on a short-time scale to control frequency.

A control system includes a wind-turbine controller 13 and a wind-park controller 23. The wind-park controller 13 controls operation of the individual wind turbine 1, e.g. selects the full-load or partial-load operation mode, depending i.a. on the current wind speed, causes, in the partial load mode, operation of the wind turbine at the optimal working point by adjusting the blade angle and controlling the tip speed ration to the aerodynamic optimum at the current wind speed, and controls the converter 19 to produce electricity according to prescriptions of the wind-park-controller, e.g. an instruction to provide a certain amount of reactive power in addition to the active power, etc. The wind-park controller 13 uses different input signals to perform its control tasks, for example signals representing current wind conditions (e.g. from an anemometer 14 and a wind vane 15), feed-back signals representing pitch angle, rotor position, amplitudes and phases of the voltage and current at the generator 12 and the terminals 9a, etc., and command signals from the wind-park controller 23.

The wind-park controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the wind-park controller 23 monitors grid stability and, upon detection of a reduction of grid stability, commands the wind-turbine controllers 13 of the wind turbine 1 and the other wind turbines of the wind park 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the wind-park controller's limit-fluctuation command. Thus, in the exemplary embodiment of FIG. 1 the control task of the control system to limit output fluctuations is shared by the wind-park controller 23 and the wind-turbine controller 13. In other embodiments this control task is performed by the wind-turbine controller 13 alone; in those embodiments, the "control system" is represented just by the turbine controller 13, without a wind-park controller.

Figure 2:
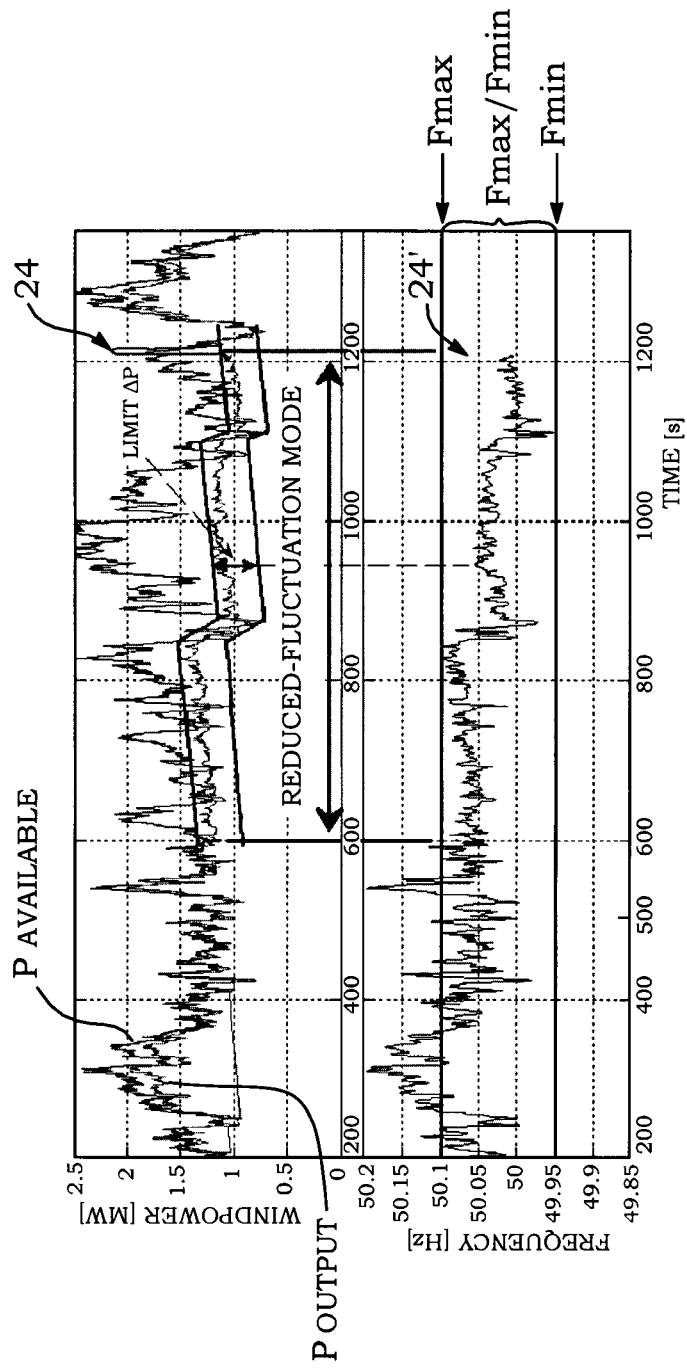
FIG. 2 illustrates, by means of an example, variation of power and frequency as a function of time in an embodiment with fluctuation-limit functionality.

Exemplary variation of power and frequency as a function of time is illustrated in FIG. 2. The upper half of FIG. 2 shows the (i) the theoretically obtainable, or "available" output power $P_{available}$ (that is the wind power multiplied by the mechano-electrical conversion efficiency), and ii) the actual output power $P_{output}$ of the wind turbine 1, e.g. measured at the terminals 9a. $P_{output}$ is nearly always below $P_{available}$. In the example shown the wind turbine 1 is assumed have a nominal power of 3 MW; as the available power $P_{available}$ stays below 3 MW in the exemplary time interval shown, the FIG. 2 illustrates a case in which the wind turbine 1 operates in the partial-load mode. In other embodiments the actual output power $P_{output}$ refers to the wind park 2, not the individual turbine 1, and is measured at the point of common coupling 21.

It can be seen from FIG. 2 that the available power $P_{available}$ fluctuates from about 30% to 100% of the maximum of the available power $P_{available}$, which is at about 2.5 MW. The fluctuation time scale (i.e. a coherence length in time) is from about 5 to 100 seconds. In FIG. 2, the wind turbine 1 is operated in the normal-operation mode between the points in time "200 s" and "600 s". In the normal-operation mode power fluctuation is not at all limited in the example shown; therefore, the actual output power $P_{output}$, nearly traces the available power $P_{available}$, and thus exhibits fluctuation similar to that of $P_{available}$.

The lower half of FIG. 2 illustrates the frequency variations as a function of time. During the first part of the normal-operation time interval, from about "200 s" to about "500 s" the variation in frequency is relatively small. This is due to regular regulation capacity against grid-frequency fluctuations during that part. Owing to the regular regulation capacity the fluctuations of the power injected in the grid 20 is largely compensated by primary controllers and/or stiffness of a large grid 20 (if the total amount of power injected and consumed in the grid 20 is very large compared to the power injected by the wind turbine 1 or the wind park 2, its relative contribution to the total power is negligible). Relative smallness of the frequency fluctuation means that the correlation between the output power of the wind turbine 1 and the grid frequency is small (close to zero). The wind-turbine controller 13, or the wind-park controller 23, monitors the regulation capacity against grid-frequency fluctuations, e.g. by evaluating said correlation and testing it against a threshold. During this first part of the normal-operation time interval no limit is therefore applied to the fluctuation of actual output power $P_{output}$.

However, at around "500 s" the amount of frequency fluctuation increases and becomes strongly correlated with the fluctuation of actual output power $P_{output}$. The wind-turbine controller 13, or the wind-park controller 23, monitoring the regulation capacity by evaluating the correlation now detects that the grid stability is reduced, e.g. by determining that the correlation exceeds said threshold. This might be due to islanding, or a failure of primary controllers, for example.

In response to that detection, after a certain time delay, the wind-turbine controller 13, or the wind-park controller 23, switches the operation mode from normal-mode to a reduced-fluctuation mode. In the exemplary FIG. 2, the reduced-fluctuation mode starts at "600 s". The wind-turbine controller 13 now cuts high-output peaks which would be produced in normal partial-load operation, by adjusting the blade-pitch angle towards the flag position. More specifically, the wind-park controller 23 sends a command to limit output power fluctuation to a certain value referred to as "Limit ΔP". The magnitude of Limit ΔP Is chosen such that the grid-frequency fluctuation is maintained inside a range $F_{max}/F_{min}$ of allowable grid-frequency variation. The magnitude corresponds to the limit just needed to keep the grid frequency inside the range $F_{max}/F_{min}$. Thus, the power production by the wind turbine 1 or wind park 2 is maximized without leaving the grid frequency fluctuate outside $F_{max}/F_{min}$. The wind-turbine controller 13 complies with the limitation command by applying an upper limit to the output power $P_{output}$. This upper limit is chosen such that the output power $P_{output}$ remains within a reference power±0.5·Limit ΔP. The reference power is not fixed, but is determined to be a running average of the output power $P_{output}$, where the time constant of averaging is larger than the fluctuation-time scale. As a result, as is illustrated in FIG. 2, the output power $P_{output}$ remains within a band of width Limit ΔP which follows, to a certain extent, long-term variation of $P_{available}$.

After a certain time period has elapsed of operation in the reduced-fluctuation mode (e.g. nearly 600 seconds in the example of FIG. 5), the wind-park controller 23 causes the wind-turbine controller to perform a test variation 24 of the output power $P_{output}$, e.g., in the form of a high-output test peak, at about 1200 s in FIG. 2. The high-output test peak is, for example, generated by not cutting a high peak in the available power $P_{available}$. However, in order to be independent of whether the natural wind provides a positive fluctuation with an amplitude sufficient to be used as a test peak 24, in other embodiments the high-output test peak 24 is generated by using kinetic energy stored in the rotating rotor 3. This may decelerate the rotor to a low, sub-optimal rotor speed.

The frequency response 24' to the high-output test 24 peak is evaluated. The detection of a small correlation, below a threshold, by the wind-park-controller 23, as illustrated in the lower half of FIG. 2 at 1200 s, is taken as an indication that the grid stability has recovered in the meantime, whereupon the wind-park-controller 23 switches the operation mode the reduced-fluctuation mode back to the normal-mode. In the exemplary FIG. 2, the normal-mode operation is resumed shortly after 1200 s. The wind-turbine controller 13 now cancels the fluctuation limit Limit ΔP, e.g. by adjusting the blade-pitch angle back in the position corresponding to optimal efficiency. Owing to the recovery of the grid stability the frequency fluctuations are now relatively small, and nearly uncorrelated with the output-power fluctuations, again.

Figure 3:
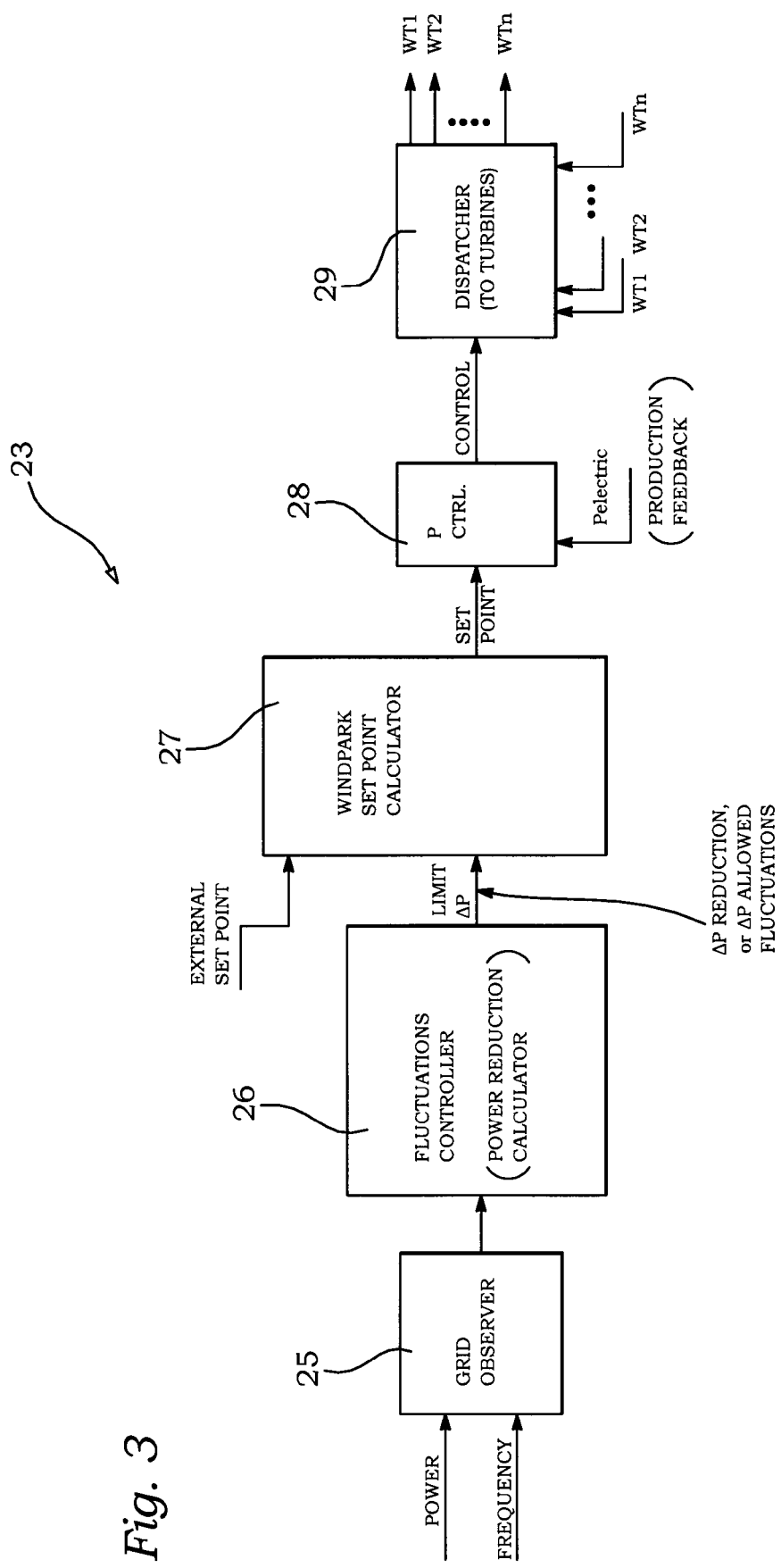
FIG. 3 is a functional circuit diagram of an embodiment of a wind-park controller arranged to perform the method explained in connection with FIG. 2.

FIG. 3 is a functional circuit diagram of an embodiment of the wind-park controller 23 arranged to perform the method explained in connection with FIG. 2. The wind-park controller 23 implements a grid-observer function 25 which monitors the grid frequency and the output power, e.g., at the point of common coupling 21 of the wind park 2. The output of the grid-observer function 25 is provided to a fluctuations controller 26 which is arranged to determine the correlation between output-power and grid-frequency fluctuations, and to determine the amount of power reduction, that is to say Limit ΔP. As explained, Limit ΔP is determined so as to allow the amount of acceptable fluctuation.

Limit ΔP is input to a wind-park set point calculator 27 which is arranged to transform it in a power-output setpoint of the wind park 2. To determine the power-output setpoint, the wind-park set point calculator 27 can also consider an external-point signal, e.g. from the grid provider. Based on the setpoint, an output-power controller 28 produces a control signal for the power to be output by the wind park 2, using on a feedback signal representing the actual power produced by the wind park 2. The control signal is fed to a dispatcher 29 which is arranged to split the regulation among the individual wind turbines (here referred to as WT1, WT2, ... WTn) of the wind park 2, and calculates individual set points. The individual setpoints may differ for the wind turbines WT1, WT2, WTn, e.g. due to different wind conditions for the for the wind turbines WT1, WT2, WTn. The dispatcher bases the splitting activity on feedbacks about the operating states of the wind turbines WT1, WT2, WTn.

The individual setpoints are transmitted to the individual wind-turbine controllers, one of which is the wind-turbine controllers 13 of FIG. 1.

The wind-plant controller 23 is thus arranged to calculate and send setpoints for the wind turbines in order to obtain a reduction of the total power to contribute to grid-frequency stability. The reduction is such that it maximizes the wind-park yield. This is also referred to as "system power balancing". The wind-park controller 23 adjusts the wind-park setpoint and the wind-turbines setpoints continuously to balance power production and frequency fluctuations.

Figure 4:
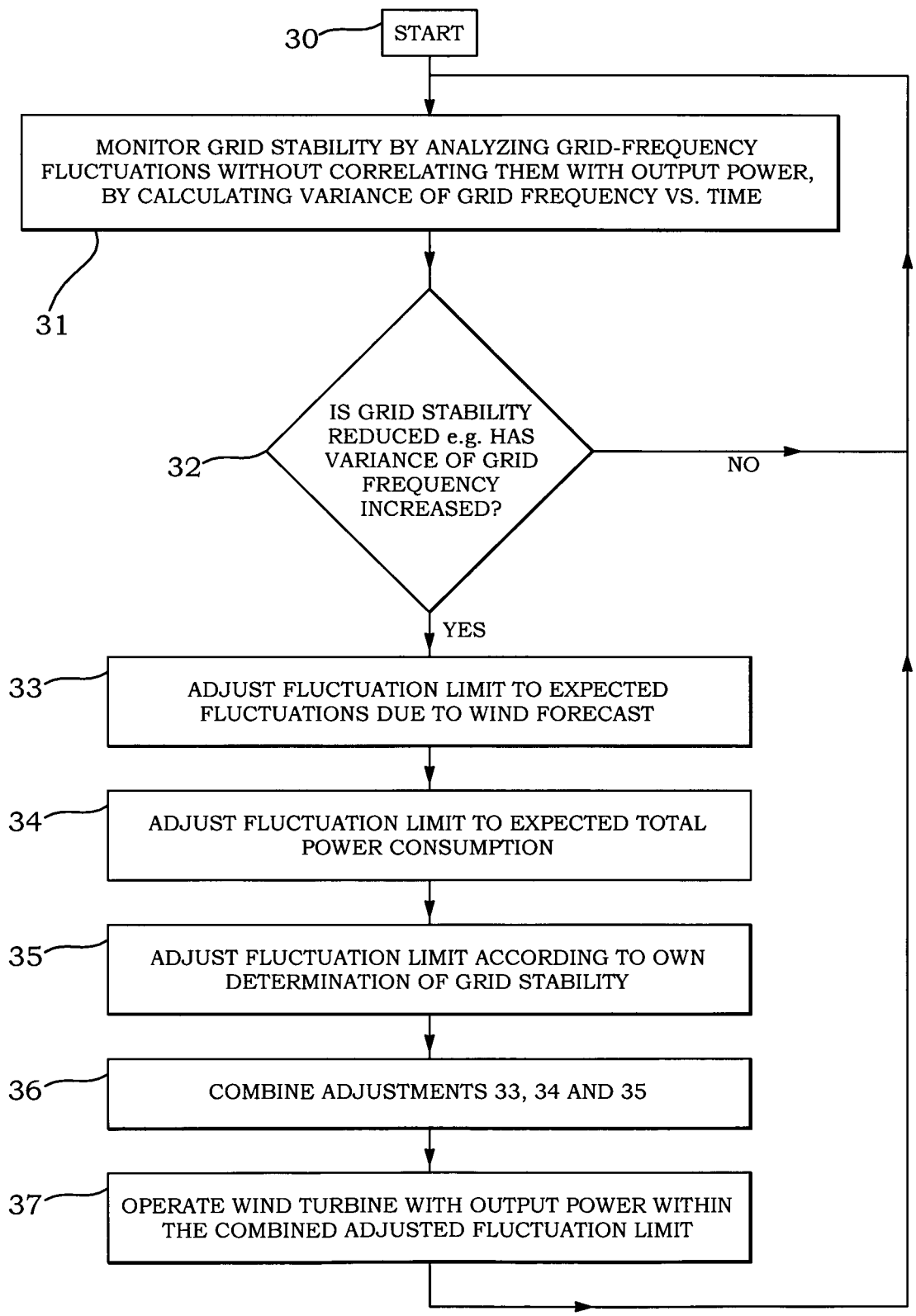
FIG. 4 is a flow diagram to illustrate additional or alternative functions of embodiments.

Additional or alternative functions of embodiments are illustrated by the flow diagram of FIG. 4.

In some embodiments, the activity of monitoring grid stability is performed by analyzing grid-frequency fluctuations without correlating them with output power, as at 31 in FIG. 4. For example, a suitable quantitative measure of the grid-frequency fluctuations is the variance (sum of quadratic deviations from the mean value). The variance is a combined weighted measure of both the amplitude and the frequency of fluctuations. As time is progressing, in some embodiments a running variance of the grid frequency vs. time is calculated.

At 32, it is ascertained whether the grid stability is changed (in particular: reduced) relative to previous grid-stability determination. For example, in the embodiment based on correlation-less grid-frequency evaluation it is ascertained whether the variance determined in 31 has increased.

The following activities can also be used in connection with the embodiments based on a correlation and/or test-signal analysis, but are only illustrated in connection with correlation-less analysis in FIG. 4.

If the answer in 32 is positive, further parameters are evaluated which may influence the strictness of the fluctuation limit to be applied. One influence is the wind forecast. Typically, the absolute amplitude of wind-power fluctuations increases grows with the wind speed, and also depends on the wind direction. Therefore, in some embodiments an estimate of the expected total frequency fluctuation from the wind turbines connected to the grid in general (not the particular one considered) is derived, e.g. by the wind-park controller, from the forecast of wind speed and direction. The wind-park controller may receive a signal representing the wind forecast over a communication line from the grid provider. Moreover, the fraction of (generally fluctuating) wind power supplied to the grid depends on the wind speed in general. In the absence of wind, there will be no fluctuation in the grid due to wind power. At 33, the fluctuation limit Limit ΔP is adjusted to expected fluctuations due to wind forecast (the limit is the stricter the greater is the expected fluctuation).

Another influence on the strictness of the fluctuation limit is the expected total power consumption in the utility grid. Therefore, in some embodiments an expectation of the total power consumption is derived, e.g. by the wind-park controller, which in turn may receive a signal representing the expected total power consumption over a communication line from the grid provider. Typically, while the absolute power fluctuation amplitude in the grid is expected to grow with the total power consumption, the relative amplitude is expected to fall with the total power consumption. Since the frequency fluctuation is more linked to the relative than to the absolute power fluctuation, the frequency fluctuation is expected to decrease with increasing total consumption. Moreover, with increasing total consumption the fraction of wind power supplied to the grid will decrease, so will decrease the grid fluctuation. Therefore, in some embodiments an estimate of the expected total frequency fluctuation is derived from a prediction of the total power consumption. At 34, the fluctuation limit Limit ΔP is adjusted to expected fluctuations due to the prediction of the total power consumption (the limit is the stricter the greater is the expected fluctuation).

At 35, the fluctuation limit Limit ΔP is adjusted according to the wind-park controller's own determination of the grid stability, e.g. based on the grid-frequency variance analysis at 31, or based on the correlation or test-signal response analysis, i.a. described in connection with FIG. 2.

At 36 the adjustments 33, 34, and 35 are combined into a combined Limit ΔP.

At 37 the wind turbine 1 is operated with output power within the combined adjusted fluctuation limit Limit ΔP. In mode-switching embodiments, this is performed in conjunction with switching to the reduced limitation mode in which the Limit ΔP may be kept constant at least over a predetermined period of time. In other embodiments no mode switching is performed, but the Limit ΔP is continuously adjusted.

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of operating at partial load a wind turbine supplying an output power to an electrical grid, the electrical grid being equipped with regulation capacity against grid-frequency fluctuations, the method comprising:
monitoring a grid stability of the electrical grid, wherein monitoring the grid stability comprises determining a correlation parameter relating the supplied output power and grid frequency; and
upon determining a reduction of the grid stability indicated by a predefined change to the correlation parameter, changing operation of the wind turbine by imposing a limit for wind-caused fluctuations in the supplied output power relative to a reference output power level.

2. The method of claim 1, wherein monitoring the grid stability comprises determining at least one of a grid-frequency fluctuation range and a variance of grid-frequency fluctuations.

3. The method of claim 1, wherein a larger value of the correlation parameter corresponds to a smaller value of the grid stability, and wherein determining a reduction of the grid stability is indicated by an increase to the correlation parameter.

4. The method of claim 1, wherein determining the correlation parameter comprises performing a test variation of the supplied output power and measuring a grid-frequency response to the test variation.

5. The method of claim 1, wherein the correlation parameter is determined according to a correlation function $$R_{xy} = \frac{1}{T_F} \int_{-T_F/2}^{T_F/2} x(t) \cdot y(t) \, dt,$$

where x(t) represents the supplied output power as a function of time t, y(t) represents the grid frequency as a function of time t, and $T_F$ represents a time period for which the correlation parameter is determined.

6. The method of claim 2, wherein the limit is selected such that:
grid-frequency fluctuations caused by the supplied output power are maintained inside a range ($F_{max}/F_{min}$) from a minimum to a maximum allowable frequency, or a variance of grid-frequency fluctuations caused by the supplied output power is maintained below a variance limit.

7. The method of claim 2, wherein the limit is continuously adjusted to maintain the grid frequency within a range ($F_{max}/F_{min}$) from a minimum to a maximum allowable frequency, or within a variance of grid-frequency fluctuations below a variance limit.

8. The method of claim 1, wherein changing operation of the wind turbine comprises:
switching from a normal-operation mode to a reduced-fluctuation mode in which the limit is imposed or reduced, in response to determining a reduction of the grid stability below a mode-switch threshold value.

9. The method of claim 2, wherein a larger value of a correlation parameter relating supplied output power and the grid frequency corresponds to imposing a stricter limit for wind-caused fluctuations in the supplied output power.

10. The method of claim 1, wherein positive fluctuations in the supplied output power are limited by cutting high-output peaks.

11. The method of claim 1, wherein the wind turbine has an optimal working point, and wherein the operating of the wind turbine with an imposed limit comprises:
operating the wind turbine at a non-optimal working point, wherein negative fluctuations in the power supplied by the wind turbine are counteracted by shifting the non-optimal working point towards the optimal working point.

12. The method according to claim 1, wherein the imposed limit is based on a wind forecast and is reduced responsive to the wind forecast forecasting increased wind-power fluctuation.

13. The method according to claim 1, wherein the imposed limit is based on an estimate of power consumption in the electrical grid and is reduced responsive to the power consumption estimate including a predicted increase of grid-frequency fluctuation.

14. The method of claim 1, wherein imposing the limit comprises reducing a previously-imposed limit for wind-caused fluctuations in the supplied output power.

15. The method of claim 8, wherein the mode-switch threshold value is increased responsive to a wind forecast forecasting increased wind-power fluctuation.

16. The method of claim 8, wherein the mode-switch threshold value is increased responsive to an estimate of power consumption in the electrical grid that includes a predicted increase of grid-frequency fluctuation.

17. The method of claim 4, wherein the measured grid-frequency response is used to determine whether to resume a previous operation mode of the wind turbine by cancelling the imposed limit.

18. The method of claim 1, wherein imposing the limit includes one or more of blade-pitch adjustments and electrical controls of a power converter of the wind turbine.

19. The method of claim 1, wherein the reference output power level is time-varying and comprises an average of the supplied output power.

20. A control system for controlling at least one wind turbine supplying an output power to an electrical grid, the control system configured to:
- monitor a grid stability of the electrical grid, the electrical grid being equipped with regulation capacity against grid-frequency fluctuations, wherein monitoring the grid stability comprises determining a correlation parameter relating the supplied output power and grid frequency; and
- upon determining a reduction of the grid stability indicated by a predefined change to the correlation parameter, change operation of the wind turbine by imposing a limit for wind-caused fluctuations in the supplied output power relative to a reference output power level.

21. A wind park, comprising:
- a wind turbine configured for supplying an output power to an electrical grid equipped with regulation capacity against grid-frequency fluctuations; and
- a control system for operating the wind turbine at partial load, the control system configured to:
    - monitor a grid stability of the electrical grid, wherein monitoring the grid stability comprises determining a correlation parameter relating the supplied output power and grid frequency; and
    - upon determining a reduction of the grid stability indicated by a predefined change to the correlation parameter, change operation of the wind turbine by imposing a limit for wind-caused fluctuations in the supplied output power relative to a reference output power level.

* * * * *